US012771932B2

(12) United States Patent
Yepez

(10) Patent No.: US 12,771,932 B2
(45) Date of Patent: Oct. 20, 2026

(54) SYSTEM AND METHOD FOR CALIBRATING CAMERA POSITION IN A COMPUTER VISION-BASED SELF-SERVICE CHECKOUT TERMINAL

(71) Applicant: NCR VOYIX Corporation, Atlanta, GA (US)

(72) Inventor: Rafael Yepez, Duluth, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/401,084

(22) Filed: Dec. 29, 2023

(65) Prior Publication Data

US 2025/0220297 A1 Jul. 3, 2025

(51) Int. Cl.
*H04N 23/57* (2023.01)
*H04N 23/60* (2023.01)
*H04N 23/63* (2023.01)
*H04N 23/90* (2023.01)

(52) U.S. Cl.
CPC ............. *H04N 23/64* (2023.01); *H04N 23/57* (2023.01); *H04N 23/632* (2023.01); *H04N 23/90* (2023.01)

(58) Field of Classification Search
None
See application file for complete search history.

(56) References Cited

U.S. PATENT DOCUMENTS 9,621,768 B1 * 4/2017 Lyon ...................... H04N 21/47
11,134,798 B1 10/2021 Yang et al.
11,341,379 B1 * 5/2022 Bagheri ................. G06V 10/10
2017/0372491 A1 * 12/2017 Doganis ............. H04N 5/44504
2020/0327315 A1 * 10/2020 Mullins ............ G08B 13/19615
2021/0195097 A1 * 6/2021 Nikitin ................... H04N 23/64
2022/0262069 A1 8/2022 Singh et al.
2023/0077198 A1 3/2023 Yepez
2023/0117218 A1 * 4/2023 Navon ................ H04L 12/4641
709/238
2023/0169287 A1 6/2023 Gao
2023/0252444 A1 8/2023 Bjelcevic et al.

(Continued)

OTHER PUBLICATIONS

Apr. 4, 2025 extended European Search Report for corresponding European patent application No. 24211699.4.

(Continued)

*Primary Examiner* — Edemio Navas, Jr.
(74) *Attorney, Agent, or Firm* — Notaro, Michalos & Zaccaria P.C.; John S. Economou

(57) ABSTRACT

A system and method for camera position calibration in a terminal. A camera has a predefined expected orientation with respect to a scan zone for the terminal such that a target zone (the scan zone or an outline thereof) appears in a predefined position within a field of view of the camera. The video output signal from the camera is combined by a processor with an overlay image file. The overlay image file has a nontransparent section and a transparent section corresponding to the predefined position of the target zone within the field of view of the camera. The video output signal is combined with the overlay image file so that the display shows an actual orientation of the camera with respect to the target zone overlaid with the overlay image file. This allows the position of the camera to be adjusted to match the predefined expected orientation.

6 Claims, 5 Drawing Sheets

(56) References Cited

U.S. PATENT DOCUMENTS

| | | | | |
|---|---|---|---|---|
| 2023/0258593 | A1* | 8/2023 | Bedau | G01N 33/48721 324/686 |
| 2023/0316368 | A1* | 10/2023 | Itaenen | G06T 7/90 382/165 |
| 2023/0345093 | A1 | 10/2023 | Yepez | |

OTHER PUBLICATIONS

Aug. 5, 2026 European Examination Report for corresponding European patent application No. 24211699.4.

* cited by examiner

SYSTEM AND METHOD FOR CALIBRATING CAMERA POSITION IN A COMPUTER VISION-BASED SELF-SERVICE CHECKOUT TERMINAL

FIELD

This disclosure relates generally to a computer vision-based self-service checkout terminal, and more particularly to a system and method for calibrating camera position in such computer vision-based self-service checkout terminal.

BACKGROUND

A vision system for use with a self-service checkout terminal is a technology that incorporates computer vision and image processing techniques to enable automated product recognition, item tracking, and transaction handling in a self-checkout environment. The vision system uses cameras and specialized software to capture image data of items and analyze and interpret the captured image data to, for example, identify the items. The vision system interfaces with software in the self-checkout terminal to convey the recognized items, quantities, and prices. The vision system is coupled via an interface to the point-of-sale (POS) system in the self-service checkout terminal and automates the transaction process by sending the item details for pricing, discounts, and payment processing. By leveraging a vision system, self-service checkout terminals provide a more efficient and streamlined experience for customers, reduce reliance on manual intervention, minimize errors, and improve overall accuracy and convenience during the checkout process.

Traditional self-service checkout terminals require a barcode on each item to be scanned separately. Vision systems speed up the checkout process by processing groups of items at the same time. However, customers must place all of the items to be purchased into the field of view of the several cameras in the vision system ("the scan zone") and remove any obstructions to viewing such items. Each of the cameras in the vision system must be positioned at a precise location and orientation in space in order to provide an accurate view of the scan zone (each camera will have a pre-assigned "target view" of the scan zone). Because the self-checkout system consists of hardware components assembled from materials (e.g., sheet metal and plastic) with inherent tolerances, the positioning of each camera in the system may require adjustment from time to time (e.g., at initial assembly, at installation, after repositioning of the system, etc.) to ensure that such camera provides the required target view. Acrylic templates have been used for camera calibration that are partly transparent in order to show the expected scan zone for the associated camera. This requires a separate acrylic template for each camera that includes an outline imposed thereon of the scan zone view for that particular camera (i.e., the acrylic template outlines or otherwise identifies the position of the scan zone within the field of view of the camera). The acrylic templates are sequentially placed over a display for the self-service checkout terminals (or a display for a computer system coupled thereto), allowing a technician to either confirm that each camera is properly targeted at the scan zone or adjust each camera to be properly targeted. This requires separate acrylic templates for each camera (because each camera will have a different view of the scan zone). Using such acrylic templates can be unwieldy and requires sets of acrylic templates for each system (or at least each store location).

The present disclosure describes a technical solution that solves the above-noted technical problems.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
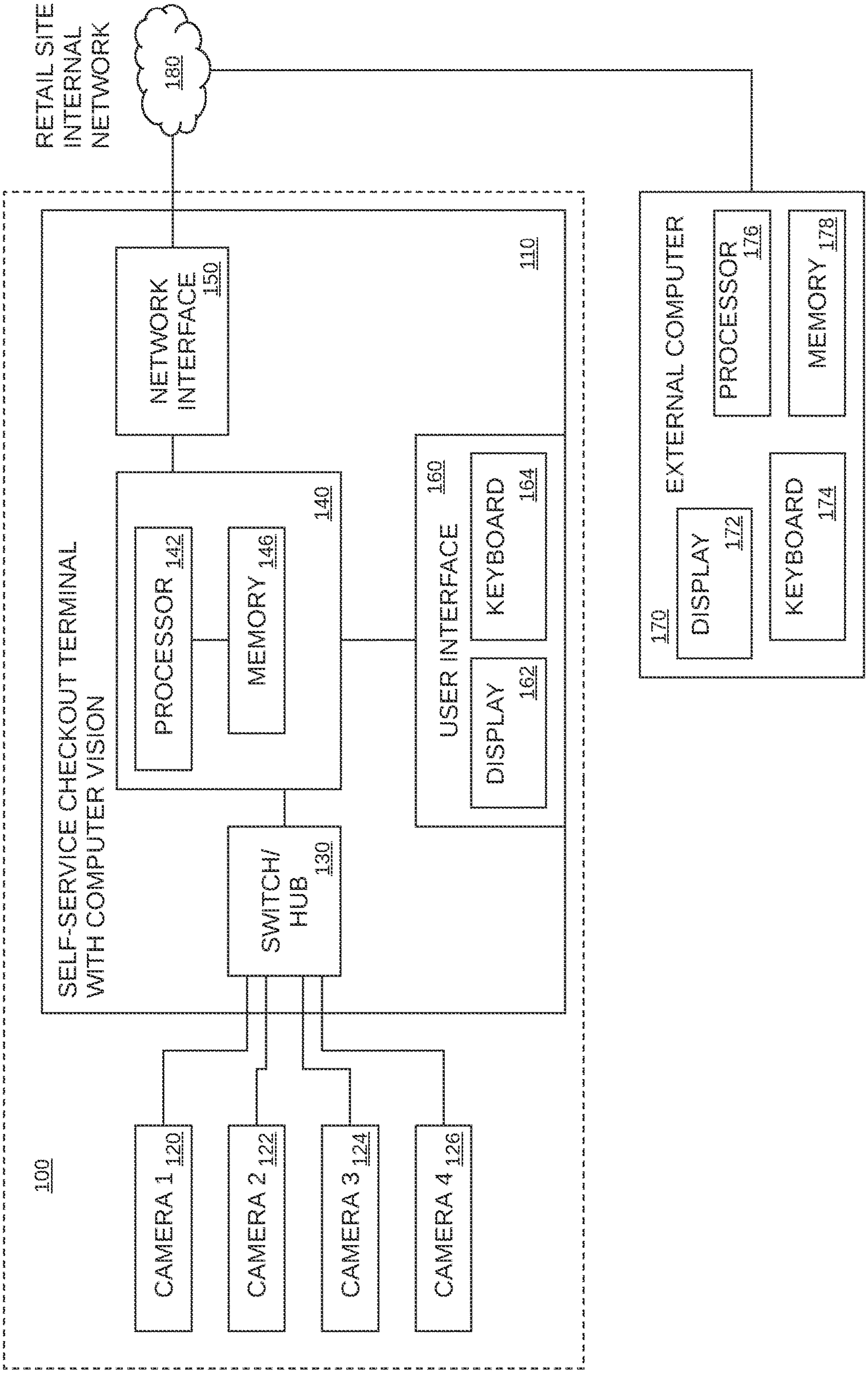
FIG. 1 is a block diagram of a self-service checkout terminal with a camera-based vision system including a tool for camera calibration according to one aspect of the present disclosure.

Referring now to FIG. 1, a self-service checkout terminal with computer vision (system 100) is shown configured for access by a technician via a computer connected to local network or an integral user interface. System 100 includes a computing section 110 and a series of cameras (four cameras 120, 122, 124, 126 are shown in FIG. 1) that are mounted in different positions to focus on a scan zone of the self-service checkout terminal. Because they are mounted in different positions, each of the cameras 120, 122, 124, 126 will have a different view of the scan zone for the terminal, so that the scan zone will have a particular predefined position within the field of view of each of the cameras 120, 122, 124, 126. Each of the cameras 120, 122, 124, 126 is preferably a network camera (as is known in the art) that is coupled to the computing section 110 via a network switch/hub 130 and transmits the output video signal in a digital format over the network. In other embodiments, the cameras 120, 122, 124, 126 may have a composite video output that are each provided to a video switch and digitizer (not shown) within the computing section 110 for further processing and/or viewing.

The network switch/hub 130 is coupled to a processing portion 140 of the computing section 110 of system 100. The processing portion 140 includes a processor 142 and a memory 146. Memory 146 includes both volatile (RAM) portions and nonvolatile (non-transitory computer readable storage medium) portions. System 100 may include more than one processing portion, e.g., one portion for processing the camera signals and performing analysis thereof, and another portion for operating the checkout functions of the terminal. The processing portion 140 is coupled to a user interface 160 that includes, inter alia, a display 162 and a keyboard 164 (or other type of data entry device). The user interface 160 is used during normal operations of the system 100 and may also be used by a technician with appropriate access rights to access a setup menu for installation and configuration of system 100, including as discussed below with respect to the flowchart of FIG. 3 for calibrating the position of cameras 120, 122, 124, 126.

Computing section 110 also includes a network interface 150 coupled to processing portion 140 and further coupled to an internal network 180 at a retail store site. An external (local) computer 170 may be coupled to the network 180 via a network interface (not shown). The external computer 170 includes, inter alia, a processor 176, a memory 178, a display 172, and a keyboard (or other user input device) 174. Memory 174 includes both volatile (RAM) portions and nonvolatile (non-transitory computer readable storage medium) portions. A technician can also access the setup menu for installation and configuration of system 100 via local computer 170 using, for example, remote login software as known in the art. The remote login software consists of commands stored in the nonvolatile portion of memory 178 and executed by processor 176.

Figure 2:
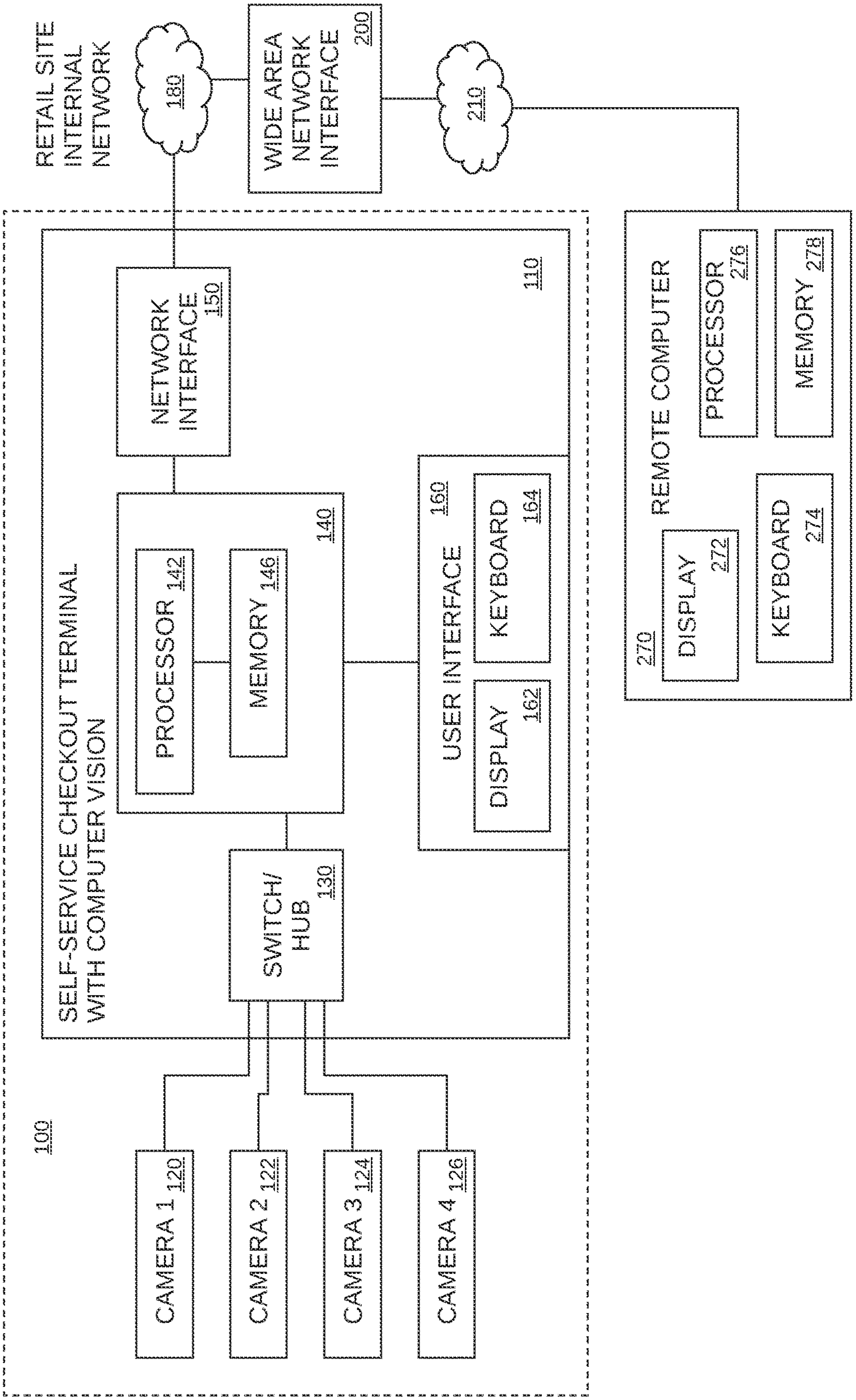
FIG. 2 is a block diagram of a self-service checkout terminal with a camera-based vision system including a tool for camera calibration according to another aspect of the present disclosure.

Referring now to FIG. 2, the self-service checkout terminal with computer vision (system 100) can also be configured to be accessed remotely via a wide area network 210 (e.g., the Internet), in addition to the integral or local access shown in FIG. 1. The remote access is provided by coupling a wide area network interface 200 to the local network 180 at the retail store site (as is known in the art). In that way, a technician using a remote computer 270 can remotely log into the self-service checkout terminal to access the setup menu for installation and calibration in the same manner as when done locally using, for example, remote login software as known in the art. The remote computer 270 includes, inter alia, a processor 276, a memory 278, a display 272, and a keyboard (or other user input device) 274. Memory 274 includes both volatile (RAM) portions and nonvolatile (non-transitory computer readable storage medium) portions. The remote login software consists of commands stored in the nonvolatile portion of memory 278 and executed by processor 276.

The setup menu provides a technician with access to a tool for use in calibrating the position of cameras 120, 122, 124, 126 and evaluating the proper operation of such cameras, either on-site or remotely. Each of the cameras 120, 122, 124, 126 is preset for a particular depth of field and diagonal field of view. When the technician performs the camera calibration, each camera is adjusted to so that the scan zone (or an outline thereof provided on the surface of or in proximity to the scan zone) matches as close as possible the position of the expected scan zone marked on an overlay combined with the video signal. In some cases, it will not be possible to perfectly match the actual scan zone or the outline thereof to the overlay scan zone because the camera is out of specification for either depth of field or diagonal field of view. When this happens, if the depth of field or diagonal field of view settings are too far out of specification, the camera can be replaced (e.g., when these camera settings are fixed) or the camera settings can be adjusted to be within specification (when the camera provides the ability to adjust such settings).

Figure 3:
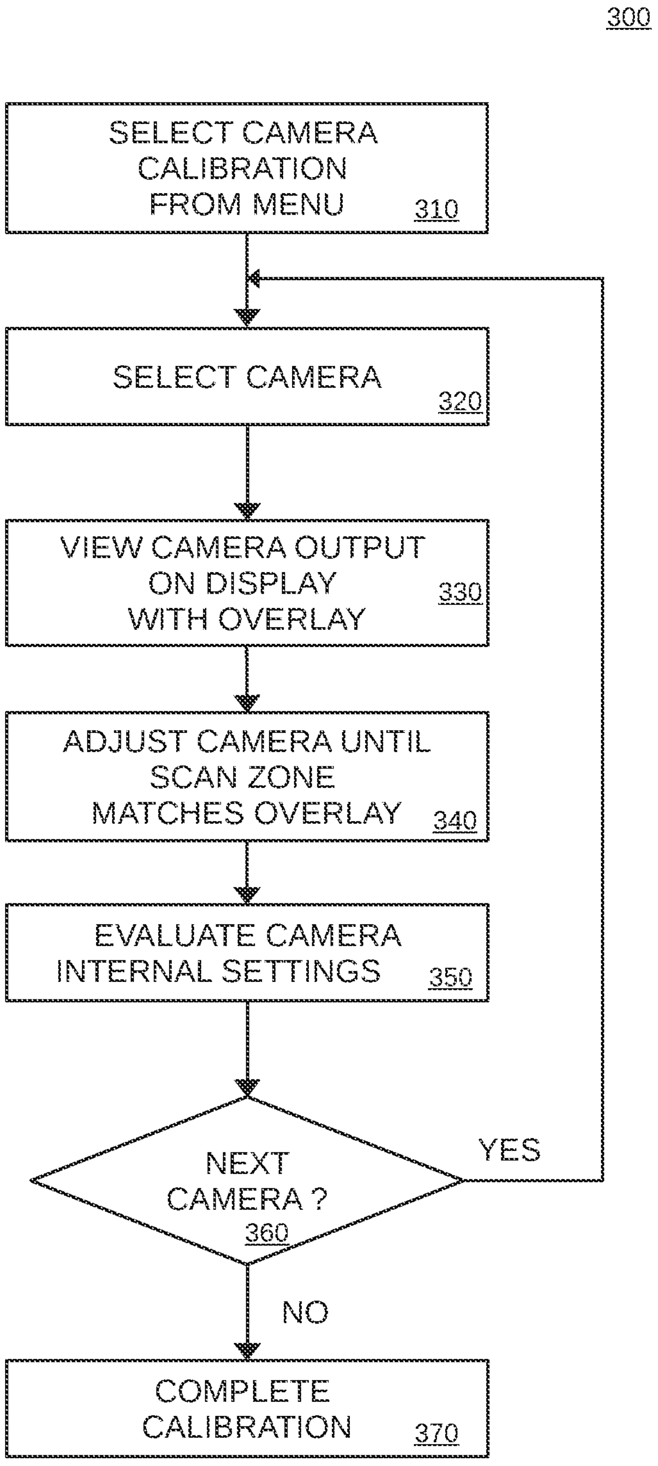
FIG. 3 is a flowchart of the camera calibration method of the present disclosure.
Figure 4A:
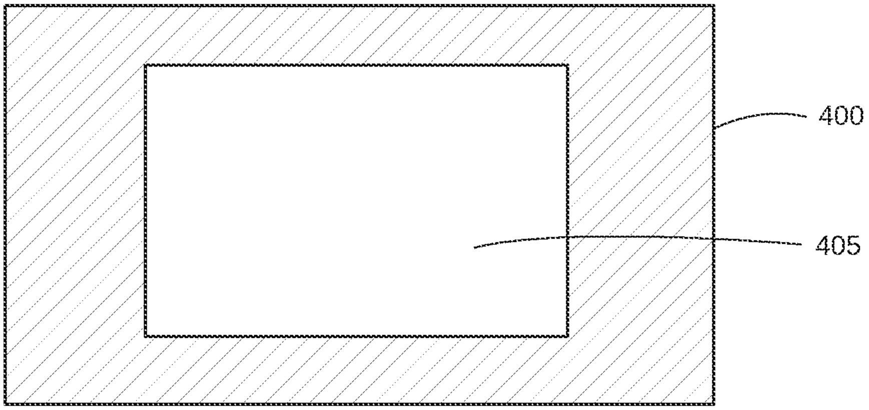
FIGS. 4A, 4B, 4C, and 4D are diagrams of different versions of example overlays that may be used for each of the respective different camera mounting positions according to the system and method of the present disclosure.
Figure 4B:
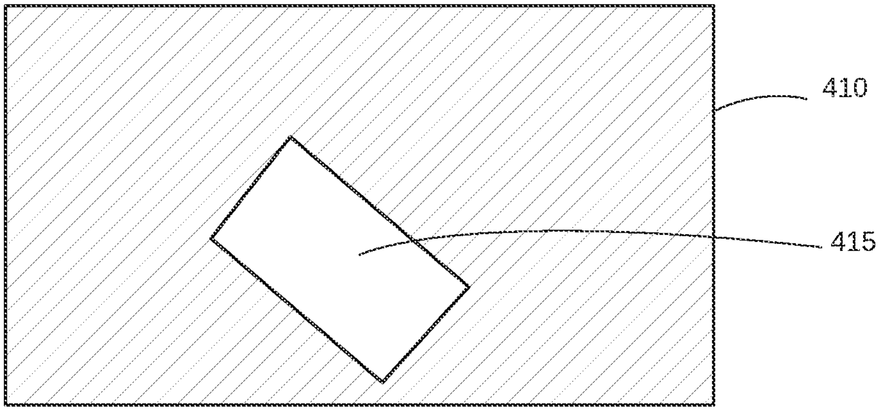
Figure 4C:
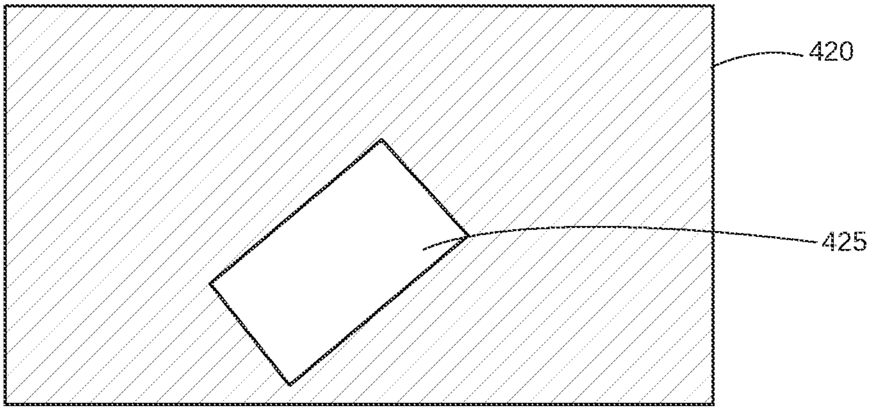
Figure 4D:
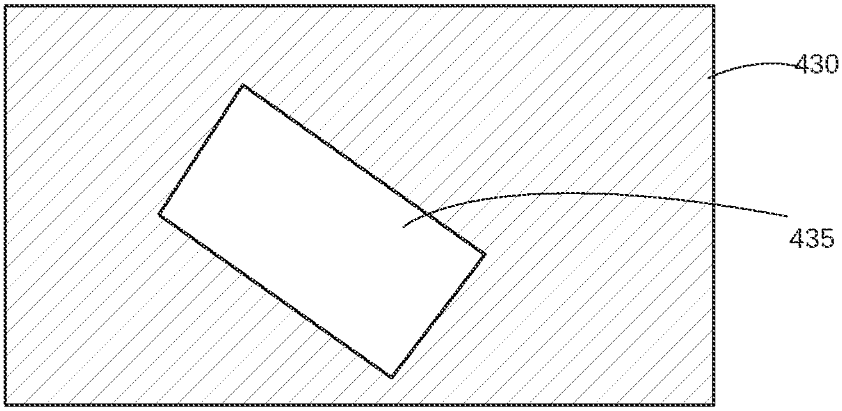
Figure 5A:
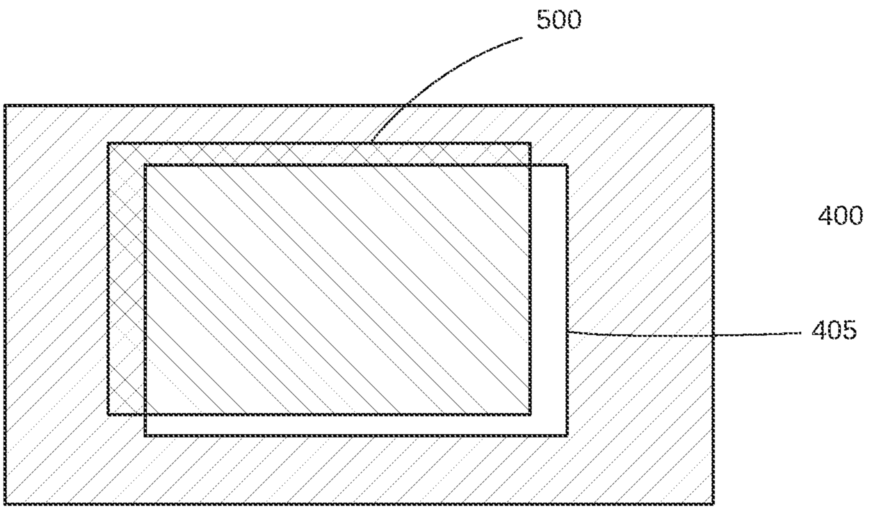
FIG. 5A is a diagram of a first display showing output of a selected camera with an electronic overlay for camera calibration with the camera out of calibration according to the system and method of the present disclosure.
Figure 5B:
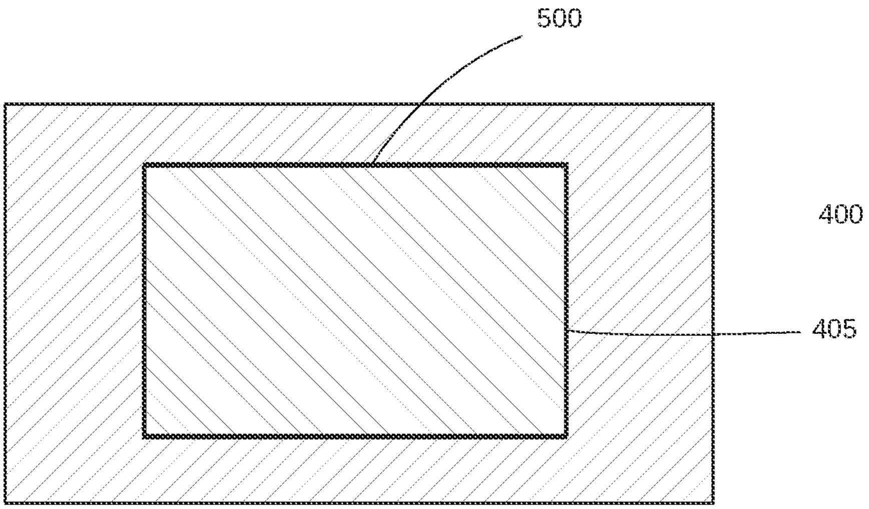
FIG. 5B is a diagram of the first display showing output of a selected camera with an electronic overlay for camera calibration with the camera properly calibrated.

Referring now to FIG. 3, a flowchart 300 is shown of the calibration method. At step 310, a technician logs into the setup and calibration menu, directly using the user interface 160, locally using a local computer 170, or remotely using a remote computer 270, as discussed above and select camera calibration. The setup calibration software consists of commands that are stored in the nonvolatile portion of memory 146 and executed by processor 142. Next, the technician selects one of the cameras in system 100 for calibration at step 320. In response, at step 330, the output from the selected camera is shown on the display (i.e., display 162, display 172, or display 272). The video is provided to the display via an application stored in memory 146 and executed by processor 142, such as StreamYard or the VLC media player, that is configured to provide an image file (overlay file) that is overlaid onto a video signal. For example, the VLC media player includes an "Add Logo" feature which allows a full view size image of an overlay of a "Target Camera view" to be used as a digital overlay over the live stream of the associated camera. The VLC media player also allows the transparency of the overlay to be adjusted, in order to better adjust the camera position to fit the overlay outline. FIG. 4A shows an overlay 400 for one camera (e.g., camera 140) that is mostly non-transparent but with a transparent center portion 405 that corresponds to the desired portion of the scan zone or the outline thereof for that camera. FIG. 4B shows an overlay 410 for a second camera (e.g., camera 142) that is mostly non-transparent but with a transparent center portion 415 that corresponds to the desired portion of the scan zone or the outline thereof for that camera. FIG. 4C shows an overlay 420 for a third camera (e.g., camera 144) that is mostly non-transparent but with a transparent center portion 425 that corresponds to the desired portion of the scan zone or the outline thereof for that camera. FIG. 4D shows an overlay 430 for a fourth camera (e.g., camera 146 that is mostly non-transparent but with a transparent center portion 435 that corresponds to the desired portion of the scan zone or the outline thereof for that camera. Once the image is overlaid and the combined video is displayed, the technician manually adjusts the associated camera so that the scan zone or the outline thereof matches the position on the overlay at step 340. This process is shown in FIGS. 5A and 5B. In FIG. 5A, the scan zone 500 is shown (this may be the actual scan zone or an outline thereof) offset from the transparent center portion 405—the starting position before adjustment. The technician then repositions the camera manually until the scan zone 500 matches the transparent center portion 405, as shown in FIG. 5B. Each camera may have, for example, an adjustable swivel mount to assist in facilitating adjustment. Next, at step 350, the technician evaluates whether there are any depth of field errors or diagonal field of view errors-based on any remaining misalignment not correctable by camera adjustment. This allows the camera settings to be adjusted, or the camera replaced if such settings are too far out of specification. At step 360, the technician either selects the next camera for calibration or, if all cameras have been calibrated, moves to finish the calibration at step 370.

By including the calibration tool in system 100, camera calibration is easily performed without any need for separate acrylic templates for each camera. This both reduces cost and makes setup much easier. This ensures that system 100 can be maintained in proper calibration and therefore provides consistent and accurate operations.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for camera position calibration in a terminal, comprising:

a computing device having a processor and a non-transitory computer-readable storage medium;

a camera coupled to the computing device having a predefined expected orientation with respect to an actual scan zone of the self-service terminal such that a target zone representing the actual scan zone or an outline thereof appears in a predefined position within a field of view of the camera, the camera providing a video output signal to the computing device;

a user interface coupled to the computing device having a display; and wherein the non-transitory computer-readable storage medium includes executable instructions that, when executed by the processor, cause the processor to:

combine the video output signal from the camera with an overlay image file, the overlay image file having a nontransparent section and a transparent section corresponding to the predefined position of the target zone within the field of view of the camera; and provide the video output signal from the camera combined with the overlay image file to the display to show an actual orientation of the camera with respect to the target zone overlaid with the overlay image file to allow a user to adjust a position of the camera so that the actual orientation of the camera with respect to the target zone matches the predefined expected orientation; and wherein the overlay image file comprises a non-transparent mask region covering substantially the entire field of view of the camera except for a transparent window, the transparent window corresponding to the predefined position of the target zone within the field of view of the camera.

2. The system of claim 1, wherein the camera is coupled to the computing device via a network connection and the video output signal is transmitted in a digital format.

3. The system of claim 1, wherein the camera transmits a composite video signal to the computing device and wherein the computing device digitizes the composite video signal and then combines the digitized composite video signal with the overlay.

4. A system for camera position calibration in a self-service terminal, comprising:

a computing device having a processor and a non-transitory computer-readable storage medium;

a plurality of cameras coupled to the computing device, each of the plurality of cameras having a predefined expected orientation with respect to an actual scan zone for of the self-service terminal such that a target zone representing the actual scan zone or an outline thereof appears in a predefined position within a field of view of the camera, each of the plurality of cameras providing a respective video output signal to the computing device;

a user interface coupled to the computing device having a user interface and a display; and wherein the non-transitory computer-readable storage medium includes executable instructions that, when executed by the processor, cause the processor to:

allow a user to select one of the plurality of cameras for calibration using the user interface;

combine the video output signal from the selected camera with an overlay image file, the overlay image file having a nontransparent section and a transparent section corresponding to the predefined position of the target zone within the field of view of the selected camera; and provide the video output signal from the selected camera combined with the overlay image file to the display to show an actual orientation of the selected camera with respect to the target zone overlaid with the overlay image file to allow a user to adjust a position of the selected camera so that the actual orientation of the selected camera with respect to the target zone matches the predefined expected orientation; and wherein the overlay image file comprises a non-transparent mask region covering substantially the entire field of view of the selected camera except for a transparent window, the transparent window corresponding to the predefined position of the target zone within the field of view of the camera.

5. The system of claim 4, wherein each of the plurality of cameras are coupled to the computing device via a network switch and the video output signal from each of the plurality of cameras is transmitted in a digital format.

6. A method for camera position calibration in a self-service terminal, the self-service terminal including a camera coupled having a predefined expected orientation with respect to an actual scan zone of the self-service terminal such that a target zone representing the actual scan zone or an outline thereof appears in a predefined position within a field of view of the camera, comprising:

combining a video output signal from the camera with an overlay image file, the overlay image file having a nontransparent section and a transparent section corresponding to the predefined position of the target zone within the field of view of the camera; and providing the video output signal from the camera combined with the overlay image file to a display to show an actual orientation of the camera with respect to the target zone overlaid with the overlay image file to allow a user to adjust a position of the camera so that the actual orientation of the camera with respect to the target zone matches the predefined expected orientation; and wherein the overlay image file comprises a non-transparent mask region covering substantially the entire field of view of the camera except for a transparent window, the transparent window corresponding to the predefined position of the target zone within the field of view of the camera.

* * * * *